(12) United States Patent
Kang et al.

(10) Patent No.: US 7,146,051 B2
(45) Date of Patent: Dec. 5, 2006

(54) APPARATUS FOR AND METHOD OF TRANSMITTING OPTICAL SIGNAL OF GRAPHIC SIGNAL

(75) Inventors: Heui-jong Kang, Yongin-si (KR); Jong-bae Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 824 days.

(21) Appl. No.: 09/876,150

(22) Filed: Jun. 8, 2001

(65) Prior Publication Data
US 2002/0048323 A1   Apr. 25, 2002

(30) Foreign Application Priority Data
Oct. 25, 2000   (KR)   ................. 2000-62874

(51) Int. Cl.
*G06K 9/36* (2006.01)
*G06K 1/00* (2006.01)
(52) U.S. Cl. ............... 382/232; 382/233; 382/236; 358/1.15
(58) Field of Classification Search ............ 382/166, 382/232–253; 358/1.15, 500, 530, 426.16; 386/65
See application file for complete search history.

(56) References Cited

U.S. PATENT DOCUMENTS 5,719,982 A * 2/1998 Kawamura et al. ......... 386/65

6,771,671 B1 * 8/2004 Fields et al. ............... 370/514

FOREIGN PATENT DOCUMENTS

| JP | 61-67090 | 4/1986 |
|---|---|---|
| JP | 64-58195 | 3/1989 |
| JP | 4-52823 | 2/1992 |
| JP | 5-260002 | 10/1993 |
| JP | 6-274137 | 9/1994 |
| JP | 8-202526 | 8/1996 |
| JP | 10-145796 | 5/1998 |
| JP | 63-206798 | 8/1998 |

* cited by examiner

*Primary Examiner*—Duy M. Dang
(74) *Attorney, Agent, or Firm*—Stein, McEwen & Bui, LLP

(57) ABSTRACT

An apparatus for and a method of transmitting a graphic signal generated by a graphic signal generation unit to a display unit. Compressed transmission data is generated according to a result of a comparison of a current graphic signal with a previous graphic signal and the transmission data is modulated together with predetermined header information. A reception interface unit restores the optical signal into the transmission data and header information and regenerates a graphic signal by decompressing the restored transmission data based on the header information. The transmission rate of data is reduced by the compression/decompression of the a graphic signal. Error correction encoding is provided to find and correct the error of data generated during transmission. A signal interference between channels, a delay of inter-channel transmission and electromagnetic radiation, which are generated by an electrical transmission method, are prevented. Long-distance transmission and external connections are simplified

30 Claims, 17 Drawing Sheets

FIG. 16

| LS TYPE | LS0 | LS1 | | | | | | | |
|---|---|---|---|---|---|---|---|---|---|
| UPPER MSBs | 1 | 1 | R6 | R7 | G6 | C7 | B6 | B7 MSB | |
| LOWER MSBs | 0 | 1 | R4 | R5 | G4 | G5 | B4 | B5 | |
| UPPER LSBs | 1 | 0 | R2 | R3 | G2 | G3 | B2 | B3 | |
| LOWER LSBs | 0 | 0 | R0 | R1 | G0 | G1 | B0 | B1 | |

FIG. 17

Frame Rate : 60 Hz    24-bit-Color

| | Pixel | Line | Pixel Clock MHz | TMDS 2.5% Gbps/ch | GVIF GVIF-DDR 1ch Gbps | HSGI-4L kbps | HSGI-4L 1ch Gbps |
|---|---|---|---|---|---|---|---|
| | Pixel | Line | | | | | |
| SVGA | 1056 | 628 | 800 | 600 | 40 | 0.40 | 1.20 | 578 | 0.35 |
| XGA | 1344 | 806 | 1024 | 768 | 65 | 0.65 | 1.95 | 739 | 0.57 |
| SXGA | 1696 | 1066 | 1280 | 1024 | 108 | 1.08 | 2.43 | 924 | 0.95 |
| UXGA | 2160 | 1250 | 1600 | 1200 | 162 | 1.62 | 3.54 | 1,154 | 1.39 |
| HDTV | 2292 | 1124 | 1920 | 1080 | 175 | 1.75 | 3.84 | 1,385 | 1.50 |
| QXGA | 2768 | 1598 | 2048 | 1536 | 265 | 2.65 | 5.19 | 1,477 | 2.27 |

TMDS : Transition Minimized Differential Signal
GVIF : Gigabit Video Interface
HSGI-4L : 4-bit Packet Line (PRESENT INVENTION)

APPARATUS FOR AND METHOD OF TRANSMITTING OPTICAL SIGNAL OF GRAPHIC SIGNAL

CROSS-REFERENCE TO RELATED APPLICATIONS

This application claims the benefit of Korean Application No. 2000-62874 filed Oct. 25, 2000 in the Korean Patent Office, the disclosure of which is incorporated herein by reference.

BACKGROUND OF THE INVENTION

1. Field of the Invention

The present invention relates to a signal transmission apparatus and method, and more particularly, to an apparatus for and a method of transmitting an optical signal of a graphic signal, by which a graphic signal is converted into a single optical channel and transmitted.

2. Description of the Related Art

Where a high-speed graphic signal is transmitted via an electrical cable divided into several channels, mutual interference occurs due to a mutual influence between channels, skew due to a delay of inter-channel transmission occurs, an increase in the amount of electromagnetic energy radiated via an electrical wire may damage peripheral devices, and the structure of a connector which connects many channels to each other is complicated.

FIG. 1 is a block diagram of a conventional graphic signal transmission apparatus. Referring to FIG. 1, a graphic chip 10 outputs an original parallel graphic signal made up of an RGB 3-channel 24-bit graphic signal, a data enable signal DE, a clock signal and a control signal. A graphic signal transmission unit 11 converts the original parallel graphic signal output from the graphic chip 10 to a serial graphic signal made up of three graphic signal channels R, G, and B and one clock signal channel. A graphic signal reception unit 12 receives the serial graphic signal, restores the serial graphic signal to the original parallel graphic signal, and transmits the restored parallel graphic signal to a display unit 13.

In the prior art, the basic colors R, G and B of graphics are allocated to three channels, respectively, and an electrical shielding device and cable shielding are fundamentally required to reduce radiated electromagnetic energy and interference between channels. In order to achieve impedance matching between the graphic signal transmission unit 11 and the graphic signal reception unit 12, a terminal impedance of the display unit 12 and a computer (not shown) which is a graphic signal generation device must be controlled according to the type of cables. A conventional graphic signal transmission apparatus is weak for long-distance transmission, and a maximum transmission distance of the conventional graphic transmission apparatus is known to be about 5 m.

In the prior art, where the basic colors R, G and B of graphics are allocated to three channels which are communicated via electrical cables, and where a high-speed graphic signal is transmitted, the signal may be distorted by electrical interference between channels and emission of excess electromagnetic energy may improperly influence peripheral devices. Also, an apparatus for compensating for a delay of transmission by channels is indispensable. Thus, an electrical shielding device and cable shielding must be essentially applied to reduce the interference between channels, a delay of inter-channel transmission and the amount of electromagnetic energy generated. Also, the terminal impedances of the display unit 13 and a computer which generates a graphic signal must be controlled according to the type of cables in order to achieve impedance matching of the graphic signal reception unit 12. Furthermore, a conventional graphic signal transmission apparatus is weak for long-distance transmission.

SUMMARY OF THE INVENTION

To solve the above problems, an object of the present invention is to provide an apparatus for transmitting an optical signal of a graphic signal having a plurality of graphic channels via a single optical channel.

Another object of the present invention is to provide a method of transmitting an optical signal of a graphic signal having a plurality of graphic channels via a single optical channel.

Additional objects and advantages of the invention will be set forth in part in the description which follows, and, in part, will be obvious from the description, or may be learned by practice of the invention.

To achieve the above and other objects of the invention, the present invention provides an apparatus for transmitting an original graphic signal generated by a graphic signal generation unit to a display unit. A transmission interface unit compares a current graphic signal with a previous graphic signal and compresses the current graphic signal based on the comparison to generate transmission data, modulates the transmission data and header information into an optical signal adapted for transmission via a single channel, and transmits the modulated optical signal to an optical transmission medium. The optical transmission medium transmits the modulated optical signal to a reception interface unit which restores the current graphic signal from the transmitted optical signal based on the transmission data and header information and transmits the restored graphic signal to the display unit.

The transmission interface unit comprises: an image compression processor which outputs the transmission data and header information using the results of the comparison between the current graphic signal and the previous graphic signal; a DC-balancing encoding unit which DC-balances the transmission data and header information so that the transmission data and header information are suitable for an optical transmission medium; a serialization unit which serializes the DC-balanced transmission data and header information; and an optical transmission unit which converts the serialized DC-balanced transmission data and header information into a serial optical signal and transmits the serial optical signal to the optical transmission medium.

A reception interface unit comprises: an optical reception unit which converts the serial optical signal received from the optical transmission medium into a serial electrical signal; a de-serialization unit which converts the serial electrical signal into a parallel electrical signal; a decoding unit which decodes the parallel electrical signal into a decoded signal comprising the transmission data and header information; and an image decompression processor which decompresses the decoded transmission data based on the header information and transmits a decompressed decoded graphic signal to the display unit.

The present invention provides a method of transmitting a graphic signal generated by a graphic signal generation unit to a display unit using an optical transmission medium, the method comprising: comparing a current graphic signal with a previous graphic signal and compressing the current graphic signal based on the comparison to output transmission data, modulating the transmission data together with header information into an optical signal suitable for transmission via a single channel optical transmission medium; transmitting the optical signal via the optical transmission medium; and restoring the optical signal to a graphic signal based on the transmission data and header information and transmitting the restored graphic signal to the display unit.

The method further comprises outputting the header information depending on the results of the comparison between the current and previous graphic signals; DC-balancing the transmission data and header information; and serializing the DC-balanced transmission data and header information prior to converting the serialized DC-balanced transmission signal into the optical signal.

The restoring of the optical signal comprises: converting the optical signal into a serial electrical signal; converting the serial electrical signal into a parallel signal; decoding the parallel signal into a signal corresponding to the transmission data and the header information; and decompressing the decoded transmission data based on the header information to output the restored graphic signal.

BRIEF DESCRIPTION OF THE DRAWINGS

The above objects and advantage of the present invention will become more apparent by describing in detail embodiments thereof with reference to the attached drawings in which:

FIG. 16 is a view for explaining the graphic signal transmission format of FIG. 15; and FIG. 17 is a table in which the data transmission rate of a conventional graphic signal transmission apparatus is compared with that of an apparatus for transmitting an optical signal of a graphic signal, according to the present invention.

DESCRIPTION OF THE PREFERRED EMBODIMENTS

Figure 1:
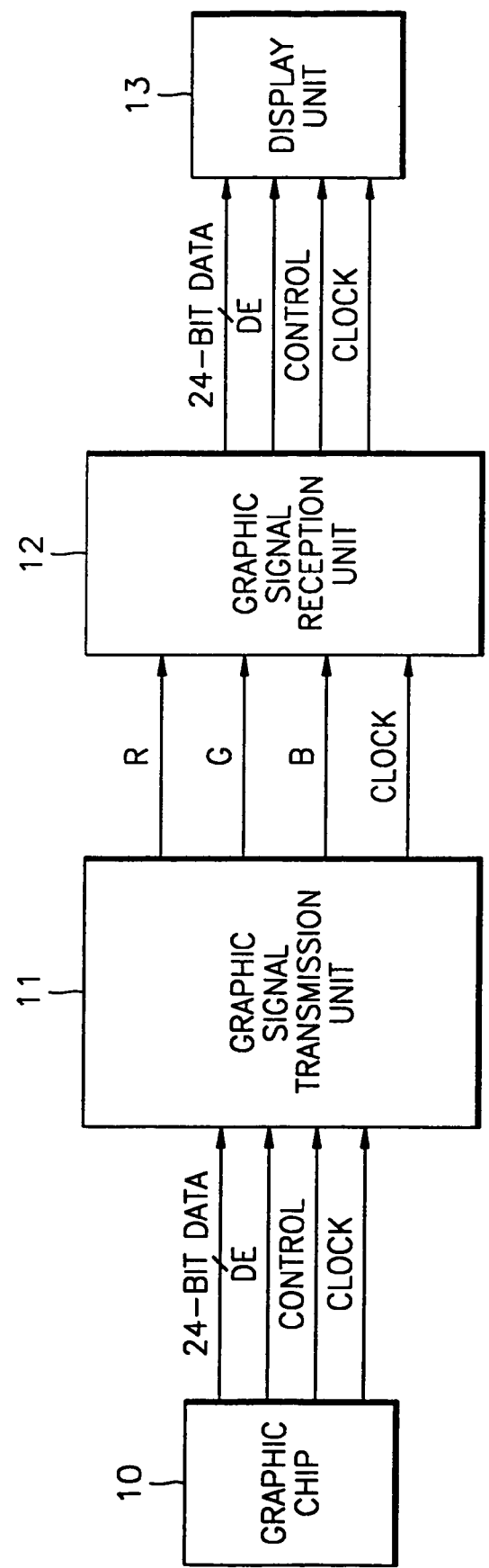
FIG. 1 is a block diagram illustrating a conventional graphic signal transmission apparatus.

Reference will now be made in detail to the present embodiments of the present invention, examples of which are illustrated in the accompanying drawings, wherein like reference numerals refer to like elements throughout.

Figure 2:
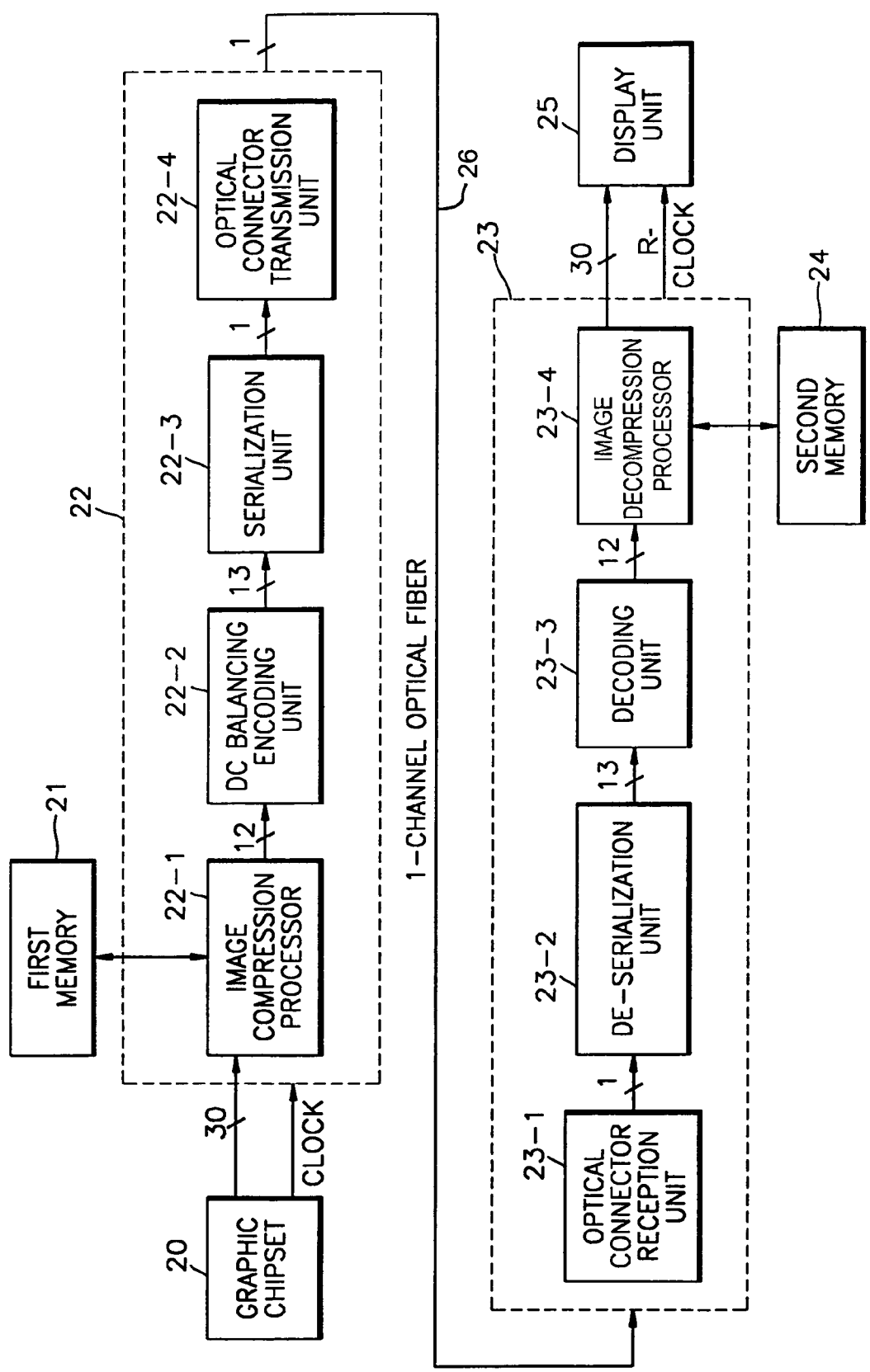
FIG. 2 is a block diagram illustrating an apparatus for transmitting an optical signal of a graphic signal, according to the present invention.

FIG. 2 is a block diagram illustrating an apparatus for transmitting a graphic signal as an optical signal, according to the present invention. The apparatus comprises a first memory 21, a transmission interface unit 22, a reception interface unit 23, a second memory 24 and a display unit 25. The apparatus is adapted to transmit and receive the optical signal along a single channel such as for example 1-channel optical fiber 26.

A graphic chipset 20, which is installed in a graphic signal generation device such as a notebook computer or a desktop computer, generates a 24-bit digital graphic signal comprising R, G and B channels (8 bits for each channel), a 6-bit control signal and a clock signal. The first memory 21 stores a previous graphic signal generated by the graphic chipset 20.

The transmission interface unit 22 compresses transmission data according to a result of a comparison of a current graphic signal with the previous graphic signal stored in the first memory 21, and modulates the transmission data and header information into a 1-channel optical signal. The transmission interface unit 22 compresses the transmission data according to the result of a comparison of corresponding pixel data of adjacent frames of a graphic signal or corresponding lines of adjacent frames, the number of lines depending on the levels of graphic resolution. The modulated transmission data and header information from the transmission interface unit 22 are transmitted to the reception interface unit 23 via a 1-channel optical transmission medium (such as for example optical fiber 26).

The reception interface unit 23 restores the transmission data and header information from the 1-channel optical transmission medium into a signal corresponding to the original graphic signal and outputs the restored graphic signal to the display unit 25. The second memory 24 stores a graphic signal to be restored by the reception interface unit 23.

The transmission interface unit 22 comprises an image compression processor 22-1, a DC balancing encoding unit 22-2, a serialization unit 22-3 and an optical connector transmission unit 22-4.

The image compression processor 22-1 compares a current 30-bit graphic signal output from the graphic chipset 20 with a previous graphic signal stored in the first memory 21 and outputs 3-channel 12-bit transmission data (where 4 bits are allocated to each channel) and predetermined header information according to the result of the comparison of the two graphic signals. The image compression processor 22-1 compares the pixel data of a current graphic signal (frame 1) with corresponding pixel data of the previous frame (frame 0). Where changes are identified, the image compression processor 22-1 selects and outputs only the information of a predetermined number of most significant bits (MSBs) for each channel from changed pixel data. When no change particulars are generated, the image compression processor 22-1 selects and outputs only the information of a predetermined number of least significant bits (LSBs) from each channel. In one embodiment as set forth below, the predetermined numbers are four and in another embodiment, the predetermined numbers are two.

Figure 3:
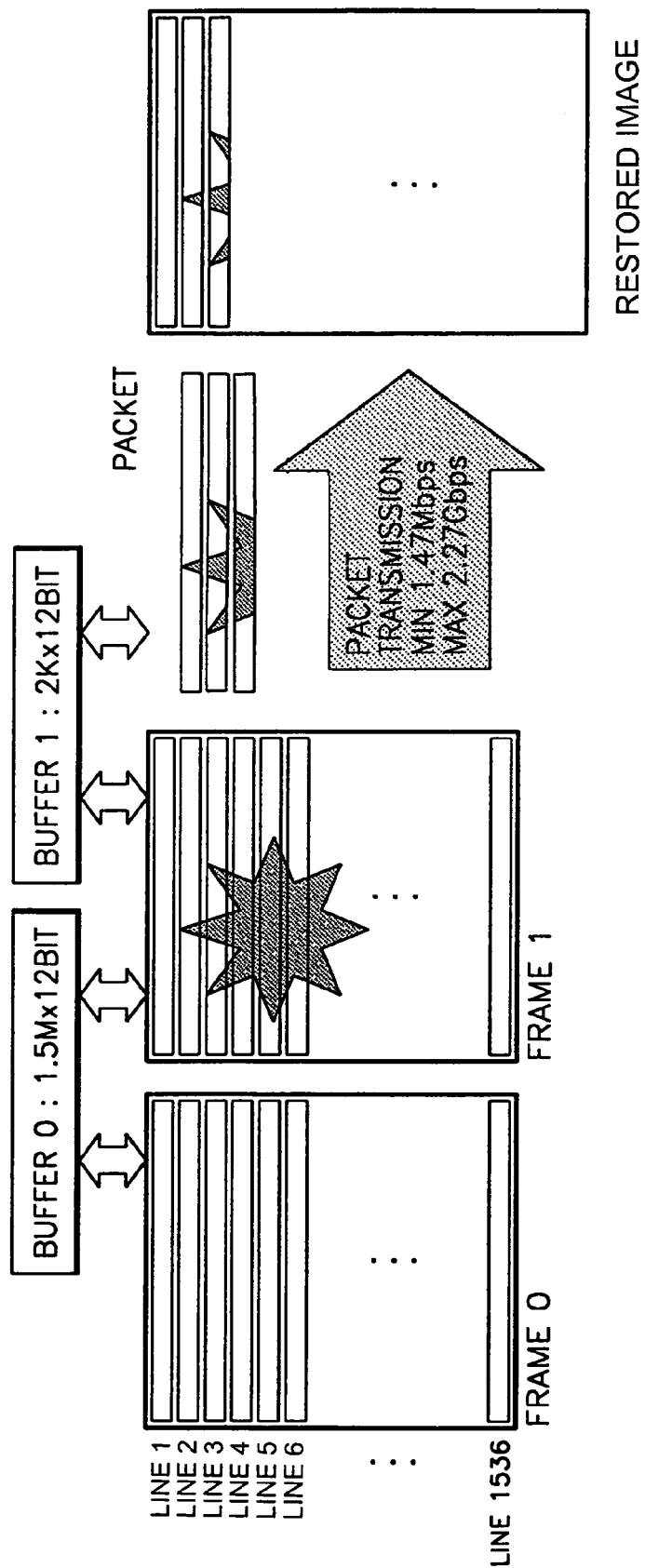
FIG. 3 is a view for explaining the image compression processor in the apparatus shown in FIG. 2.

FIG. 3 is a view illustrating the operation of the image compression processor 22-1 in the apparatus shown in FIG. 2. The buffer shown in FIG. 3 is the same as the first memory 21 of FIG. 2. As shown in FIG. 3, line data (lines 1, 2, 3 . . . 1536) of frame 0 are stored in the buffer. Then, the line 1 data of currently-received frame 1 is compared with the line 1 data of frame 0 stored in the buffer. If the line 1 data of current-received frame 1 includes changed pixels relative to the line 1 data of the frame 0, four MSBs per pixel per color are output. If the line 1 data of current frame 1 includes no changed pixels relative to the line 1 data of the frame 0, four LSBs per pixel per color are output. After this process, the buffer is updated by replacing the line 1 data of frame 0 with the line 1 data of frame 1. Then, the line 1 data of currently-received frame 2 is compared with the line 1 data of frame 1 stored in the buffer and the process repeats for frame 2 and subsequent frames in like manner as for frame 1. If the first line data of the current frame 2 includes changed pixels in step-1, four MSBs are output. If the first line data of the current frame 2 includes no changed pixels in step-2, four LSBs are output. After this process, the line data of frame 2 is updated in the first memory 21. A 1.47 Mbps packet transmission occurs where data of one line is transmitted and a 2.27 Gbps transmission occurs where data of all lines of a frame are transmitted.

Figure 4:
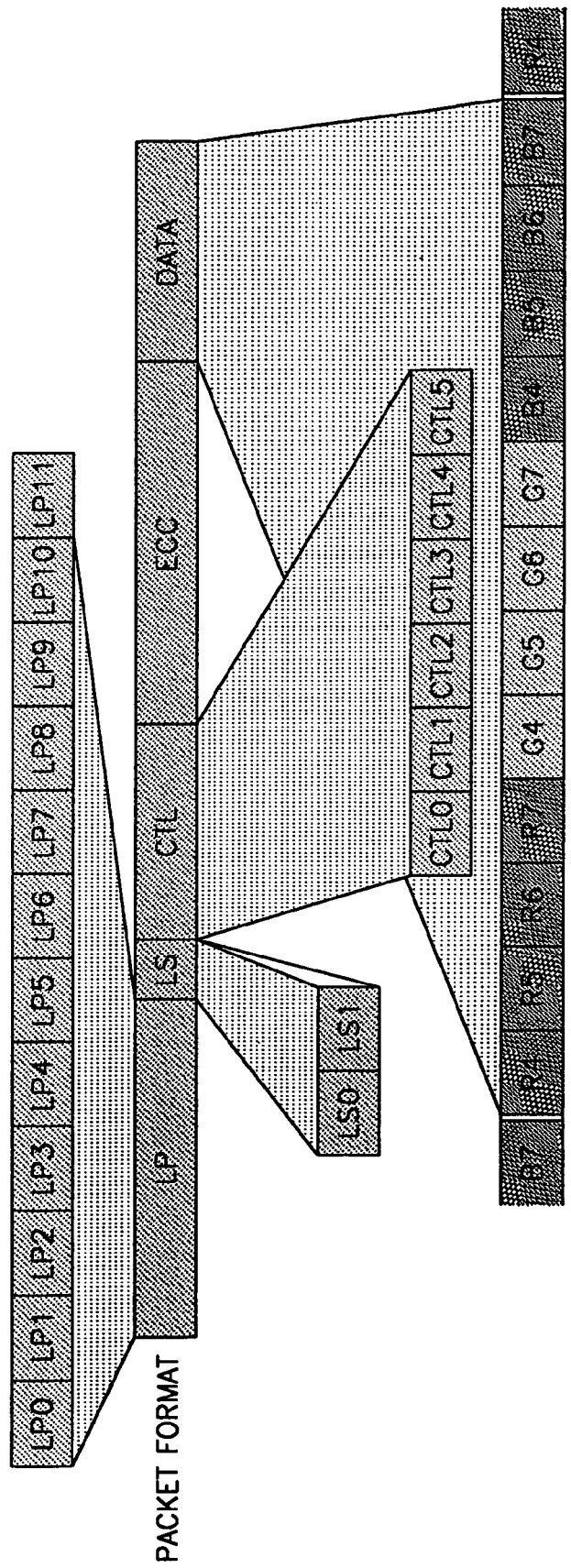
FIG. 4 shows the structure of transmitted data in the apparatus shown in FIG. 2.

Referring now to FIG. 4, the image compression processor 22-1 outputs compressed 4-bit transmission data (R4-R7, G4-G7, and B4-B7) and header information depending on transmission data. The header information is made up of a 12-bit line position LP (LP0-LP11) for identifying the line number of a changed line, a 2-bit line state LS (LS0-LS1) for identifying the changed graphic data state (MSB 4-bit or LSB 4-bit), and a 6-bit control signal CTL (CTL0-CTL5), including a 1-bit data enable signal DE with respect to a digital graphic signal, a 2-bit horizontal/vertical sync signal HSYNC/VSYNC and 3 extra control bits. A 15-bit error correction code (ECC) for correcting an error of the header which defines the state of graphic data is further added to the header information. Thus, as shown in FIG. 4, 35 bits of header information and 12 bits of transmission data per pixel are output from the image compression processor 22-1 for each line of a frame.

Figure 5:
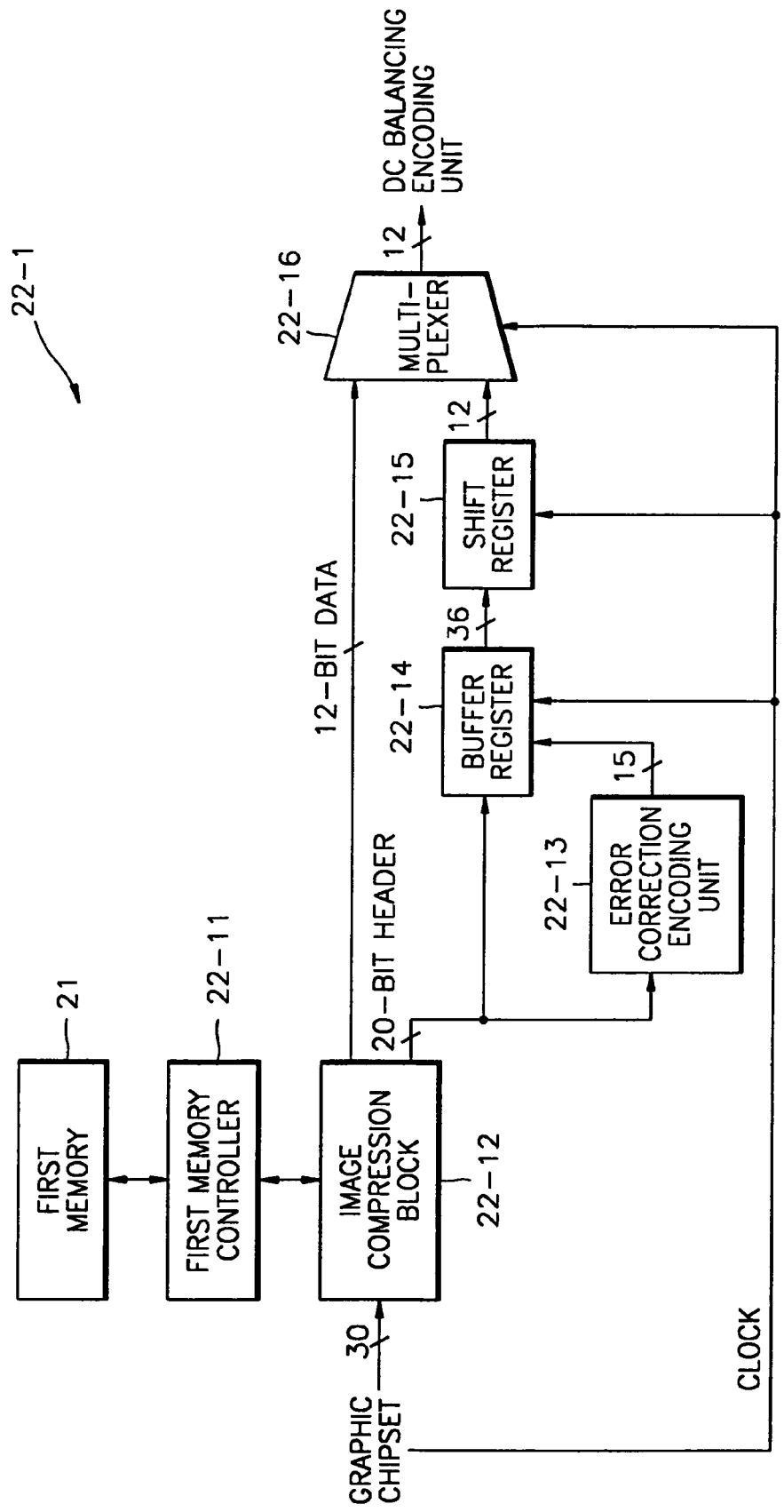
FIG. 5 is a detailed block diagram of the image compression processor in the apparatus shown in FIG. 2.

FIG. 5 is a detailed block diagram of the image compression processor 22-1. The image compression processor 22-1 comprises a first memory controller 22-11, an image compression block 22-12, an error correction encoding unit 22-13, a buffer register 22-14, a shift register 22-15 and a multiplexer 22-16. The image compression block 22-12 compares a previous graphic signal stored in the first memory with a current graphic signal under the control of the first memory controller 22-11 and outputs 12-bit transmission data per pixel and 20-bit header information per line.

The error correction encoding unit 22-13 adds 15 bits of ECC with respect to the 20bits of header information and outputs the 15 bits of ECC to the buffer register 22-14. The buffer register 22-14 buffers a total of 35 bits including 20 bits of header information and 15 bits of ECC. The shift register 22-15 sequentially outputs 35 bits of header information received from the buffer register 22-14, by 12 bits at a time. The multiplexer 22-16 switches the 12-bit per pixel transmission data output from the image compression block 22-12 and the 12 bits of header information output from the shift register 22-15, in response to the clock signal output from the graphic chipset 20 so that the pixel data for a line follows the header information for the same line.

Figure 6:
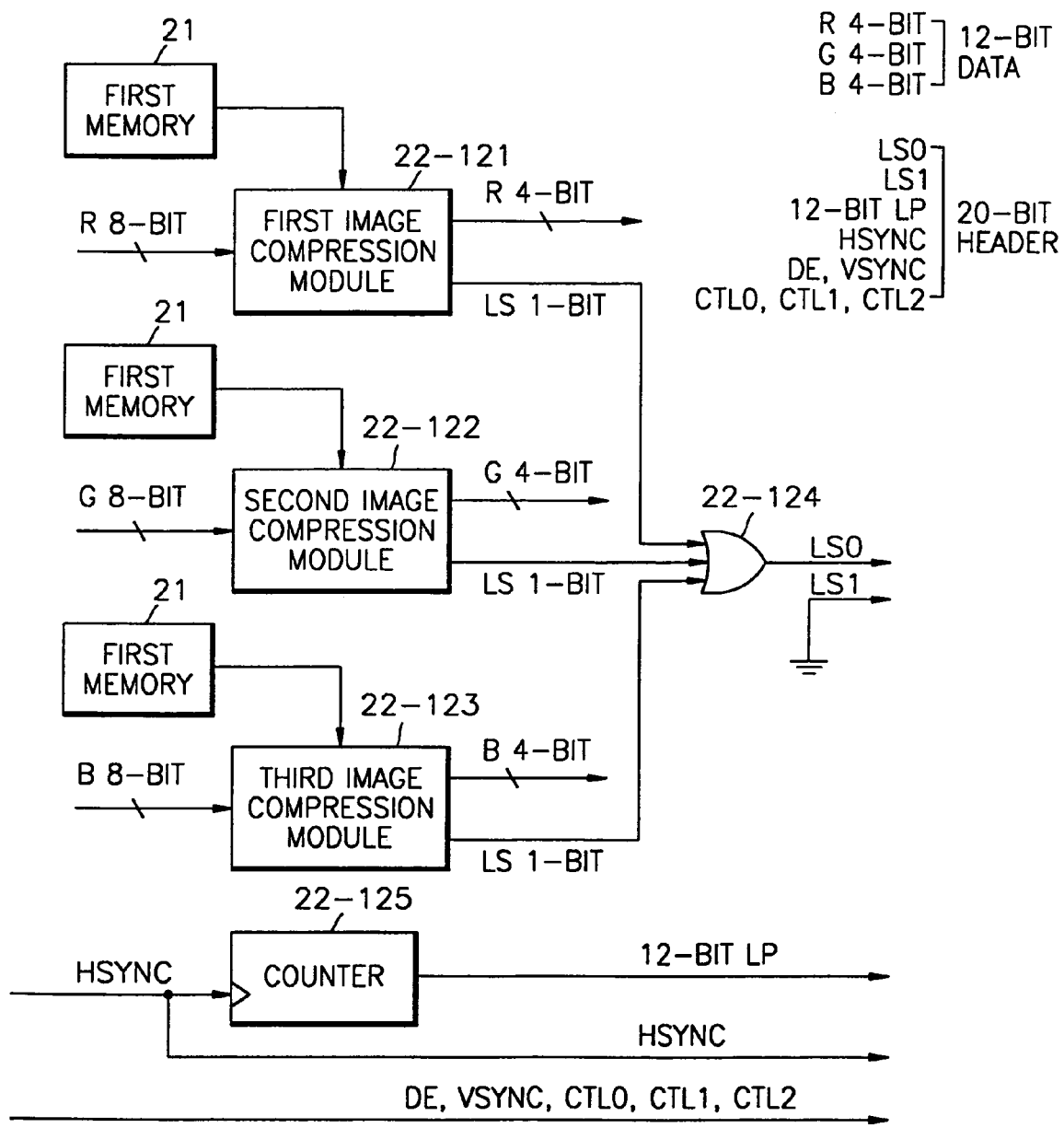
FIG. 6 is a detailed block diagram of the image compression modules in the image compression block shown in FIG. 5.

FIG. 6 is a detailed block diagram of the image compression block 22-12. The image compression block 22-12 comprises first, second and third image compression modules 22-121, 22-122 and 22-123, an OR unit 22-124 and a counter 22-125. The first image compression module 22-121 compares current 8-bit pixel data R output from the graphic chipset 20 with previous 8-bit pixel data R stored in the first memory 21 and outputs four MSBs or four LSBs of pixel data R according to whether changes occur between corresponding pixel data of a line of a current frame and a line of a previous frame. At this time, one bit of LS representing the state of changed graphic data for pixel data R is also output.

The second image compression module 22-122 compares current 8-bit pixel data G output from the graphic chipset 20 with previous 8-bit pixel data G stored in the first memory 21 and outputs four MSBs or four LSBs of pixel data G according to whether changes occur between corresponding pixel data of a line of a current frame and a line of a previous frame At this time, one bit of LS representing the state of changed graphic data for pixel data G is also output.

The third image compression module 22-123 compares current 8-bit pixel data B output from the graphic chipset 20 with previous 8-bit pixel data B stored in the first memory 21 and outputs four MSBs or four LSBs of pixel data B according to whether changes occur between corresponding pixel data of a line of a current frame and a line of a previous frame At this time, one bit of LS representing the state of changed graphic data for pixel data B is also output.

The OR unit 22-124 performs an OR operation on one bit of LS output from each of the first, second and third image compression modules 22-121, 22-122 and 22-123 to obtain LS0. A final line state LS is made up of the value LS0 calculated by the OR unit 22-124 and a fixed value LS1. The counter 22-125 counts a horizontal synchronous signal HSYNC and outputs a 12-bit LP for identifying the line number of a changed line.

Figure 7A:
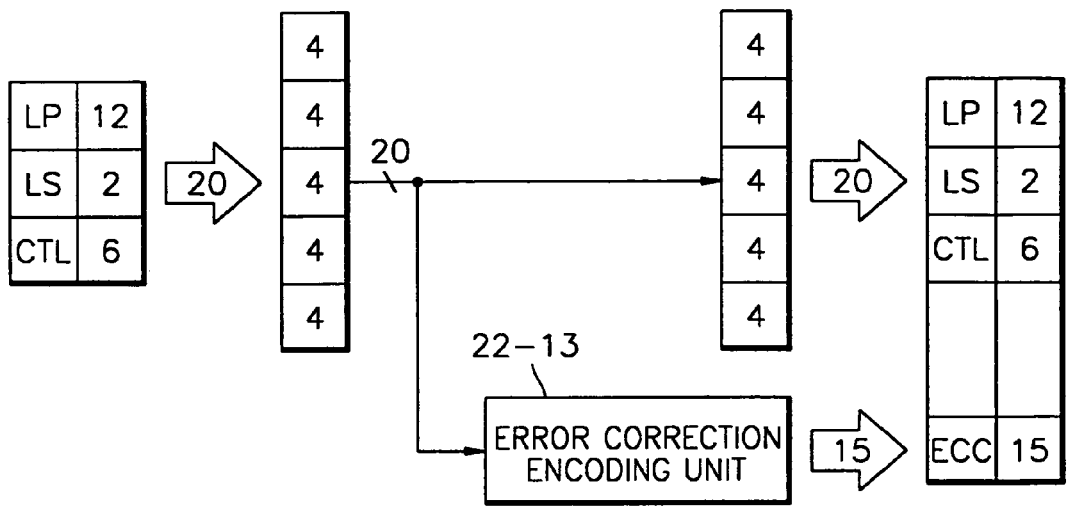
FIGS. 7A and 7B are block diagrams for illustrating error correction encoding performed in the image compression processor shown in FIG. 5.
Figure 7B:
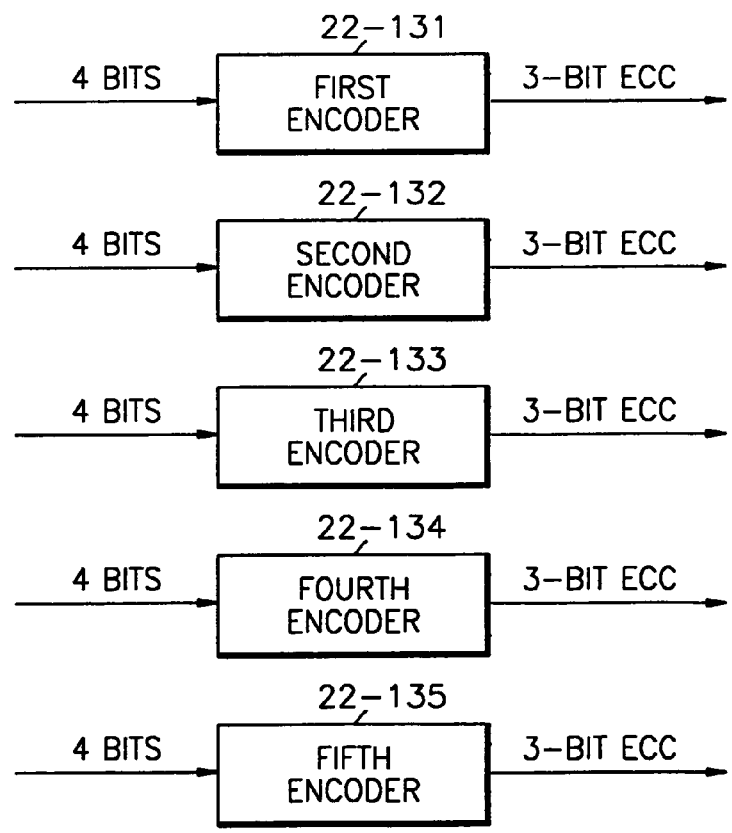

FIGS. 7A and 7B are block diagrams for explaining the error correction encoding unit 22-13 in the image compression processor of FIG. 5. As shown in FIG. 7B, the error correction encoding unit 22-13 includes first through fifth encoders 22-131, 22-132, 22-133, 22-134 and 22-135.

As shown in FIG. 7A, 20-bit header information made up of a 12-bit LP, a 2-bit LS and a 6-bit control signal CTL, which is output from the image compression block 22-12, is divided into 4-bit groups. The error correction encoding unit 22-13 receives the header information divided into 4-bit groups and outputs a 15-bit error correction encoded value. Thus, the header information has a total of 35 bits. Referring to FIG. 7B, the first through fifth encoders 22-131, 22-132, 22-133, 22-134 and 22-135 receive one of the five pieces of 4-bit header information, respectively, and each outputs a 3-bit error correction code with respect to a corresponding received 4-bit header information.

Referring again to FIG. 5, the buffer register 22-14 buffers the 15 bits of ECC and the 20 bits of header information and outputs a total of 36 bits to shift register 22-15. The shift register 22-15 sequentially outputs the 36 bits of header information received from the buffer register 22-14, by 12 bits at a time. The multiplexer 22-16 switches the 12-bit per pixel transmission output from the image compression block 22-12 and the 36 bits of header information, output 12 bits at a time from the shift register 22-15, in response to the clock signal output from the graphic chipset 20.

Referring again to FIG. 2, the DC balancing encoding unit 22-2 DC-balances the multiplexed transmission data and header information output from the multiplexer 22-16 of the image compression processor 22-1 to adapt to an optical transmission medium, adds a DC balancing bit to the 12-bit multiplexed transmission data and header information and outputs a 13 bit signal.

Figure 8:
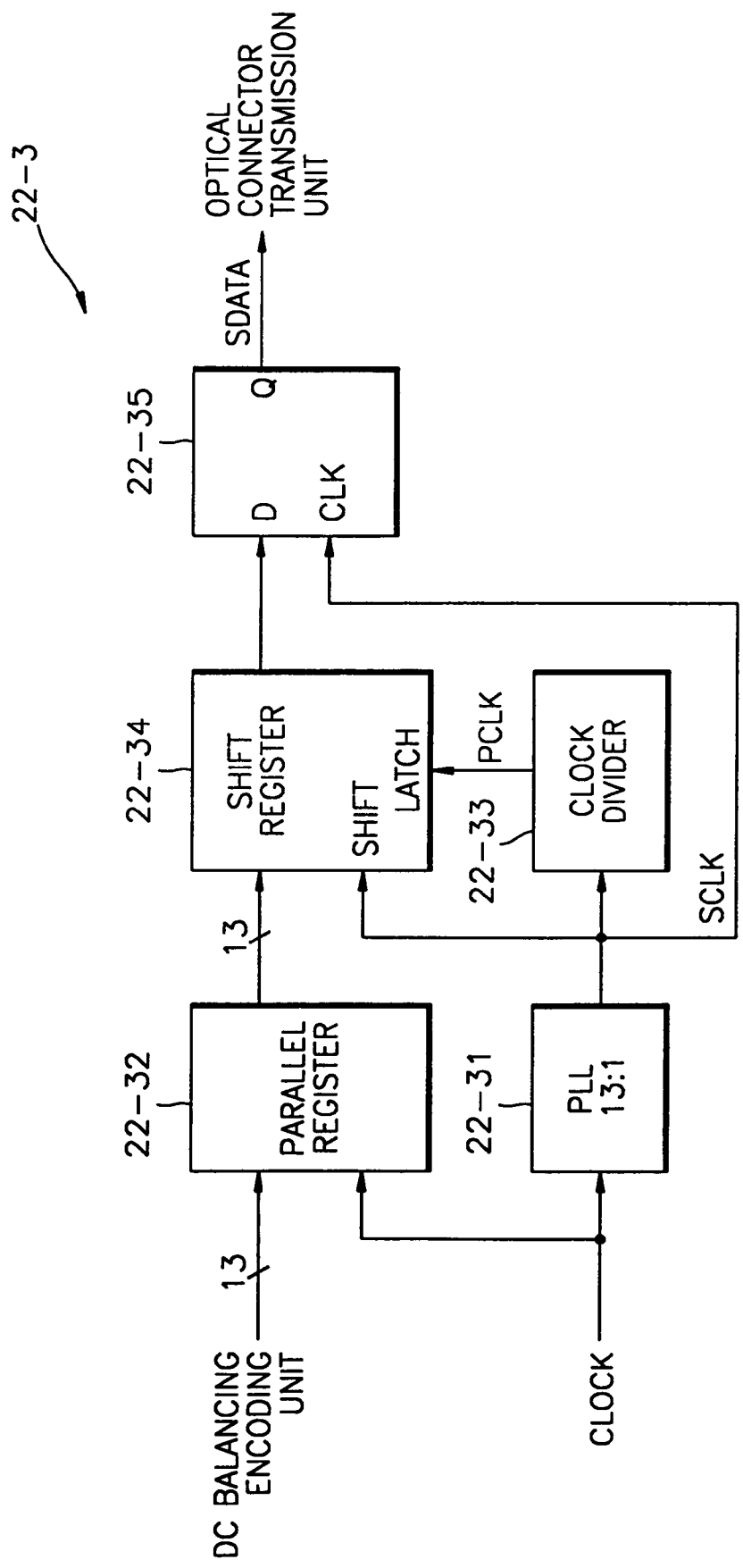
FIG. 8 is a detailed block diagram of the serialization unit of the apparatus shown in FIG. 2.

The serialization unit 22-3 serializes the 13 bit DC-balanced transmission data and header information. FIG. 8 is a detailed block diagram of the serialization unit 22-3. The serialization unit 22-3 comprises a phase locked loop (PLL) 22-31, a parallel register 22-32, a clock divider 22-33, a shift register 22-34 and a D flip-flop 22-35.

The PLL 22-31 is a 13:1 clock multiplier which converts an input clock into a signal SCLK having a frequency that is 13 times higher than the input clock. The parallel register 22-32 stores the 13 bit transmission data and header information which have been DC balanced and encoded.

The clock divider 22-33 divides the clock signal SCLK output from the PLL 22-31 into 13 clocks PCLK. The shift register 22-34 serially shifts out 13-bit DC-balanced and encoded transmission data and header information output from the parallel register 22-32 in response to the clock signal SCLK of the PLL 22-31 and signal PCLK. The D flip-flop 22-35 synchronizes the serialized data with the clock signal SCLK to output serialized data SDATA.

The optical connector transmission unit 22-4 (see FIG. 2) outputs an optical signal comprising the serialized transmission data and header information SDATA to a 1-channel optical transmission medium, such as optical fiber 26.

Referring again to FIG. 2, the reception interface unit 23 comprises an optical connector reception unit 23-1, a de-serialization unit 23-2, a decoding unit 23-3 and an image decompression processor 23-4. The optical connector reception module 23-1 receives the optical signal comprising the serialized transmission data and header information SDATA from the 1-channel optical fiber 26 and converts the optical signal into an electrical graphic signal. The de-serialization unit 23-2 de-serializes the electrical graphic signal output from the optical connector reception unit 23-1 and outputs a 13-bit parallel graphic signal.

Figure 9:
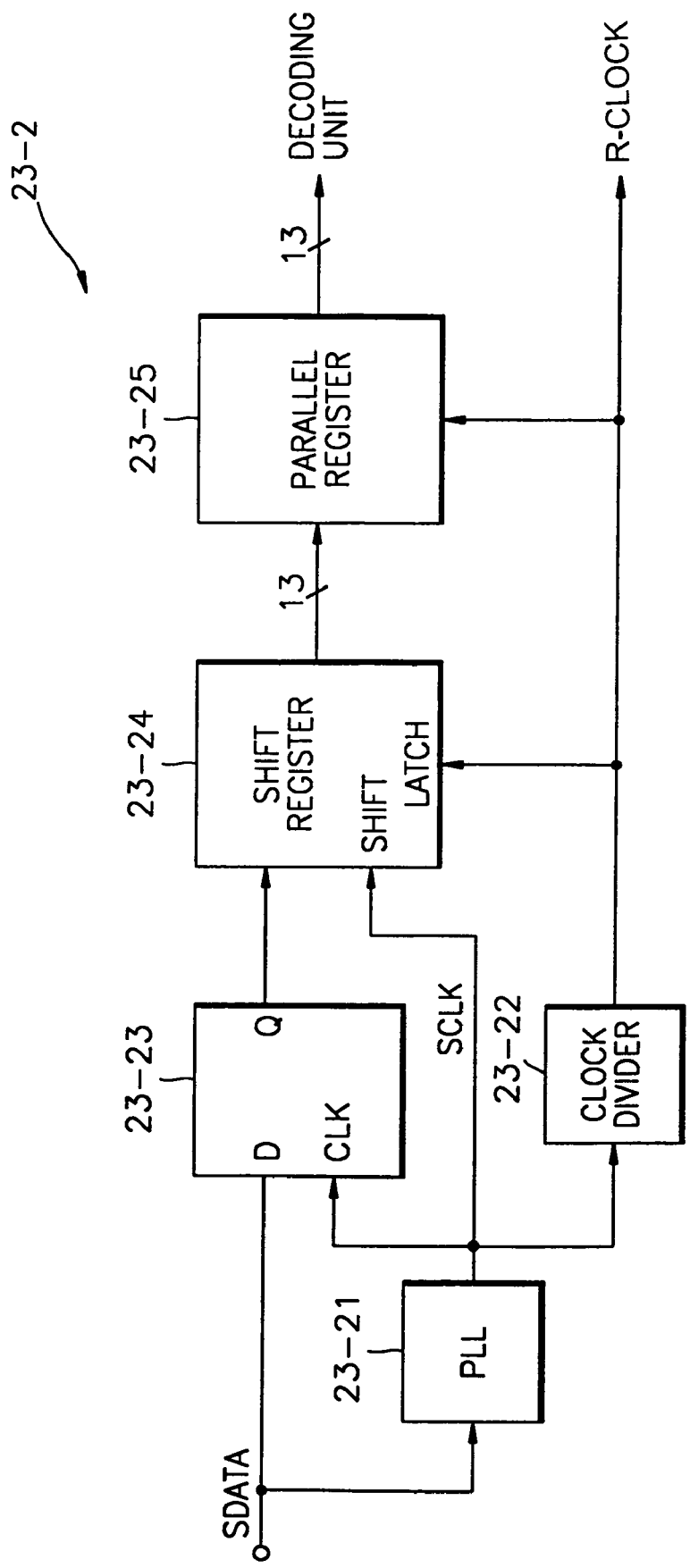
FIG. 9 is a detailed block diagram of the de-serialization unit in the apparatus shown in FIG. 2.

FIG. 9 is a detailed block diagram of the de-serialization unit 23-2. The de-serialization unit 23-2 comprises a PLL 23-21, a clock divider 23-22, a D flip-flop 23-23, a shift register 23-24 and a parallel register 23-25. The PLL 23-21 receives serialized data SDATA and generates a clock signal SCLK. The clock divider 23-22 outputs a signal R-CLOCK having a frequency that is one-thirteenth of the clock signal SCLK output from the PLL 23-21. The D flip flop 23-23 outputs the serialized data SDATA in synchronization with the clock signal SCLK output from the PLL 23-21.

The shift register 23-24 stores data output from the D flip-flop 23-23 and shifts out the stored data when the stored data has 13 bits. The parallel register 23-25 stores the 13-bit data output from the shift register 23-24 and then outputs the 13-bit data to the decoding unit 23-3 (FIG. 2).

Referring again to FIG. 2, the decoding unit 23-3 decodes the 13-bit data comprising the transmission data and header information output from the de-serialization unit 23-2 and outputs 12-bit data comprising the transmission data and header information to the image decompression processor 23-4.

The image decompression processor 23-4 de-multiplexes the 12-bit transmission data and header information output by the decoding unit 23-3 to separately output 12-bit per pixel transmission data and header information, performs error correction decoding on the header information, decompresses the 12-bit transmission data and outputs a decompressed parallel graphic signal to the display unit 25.

Figure 10:
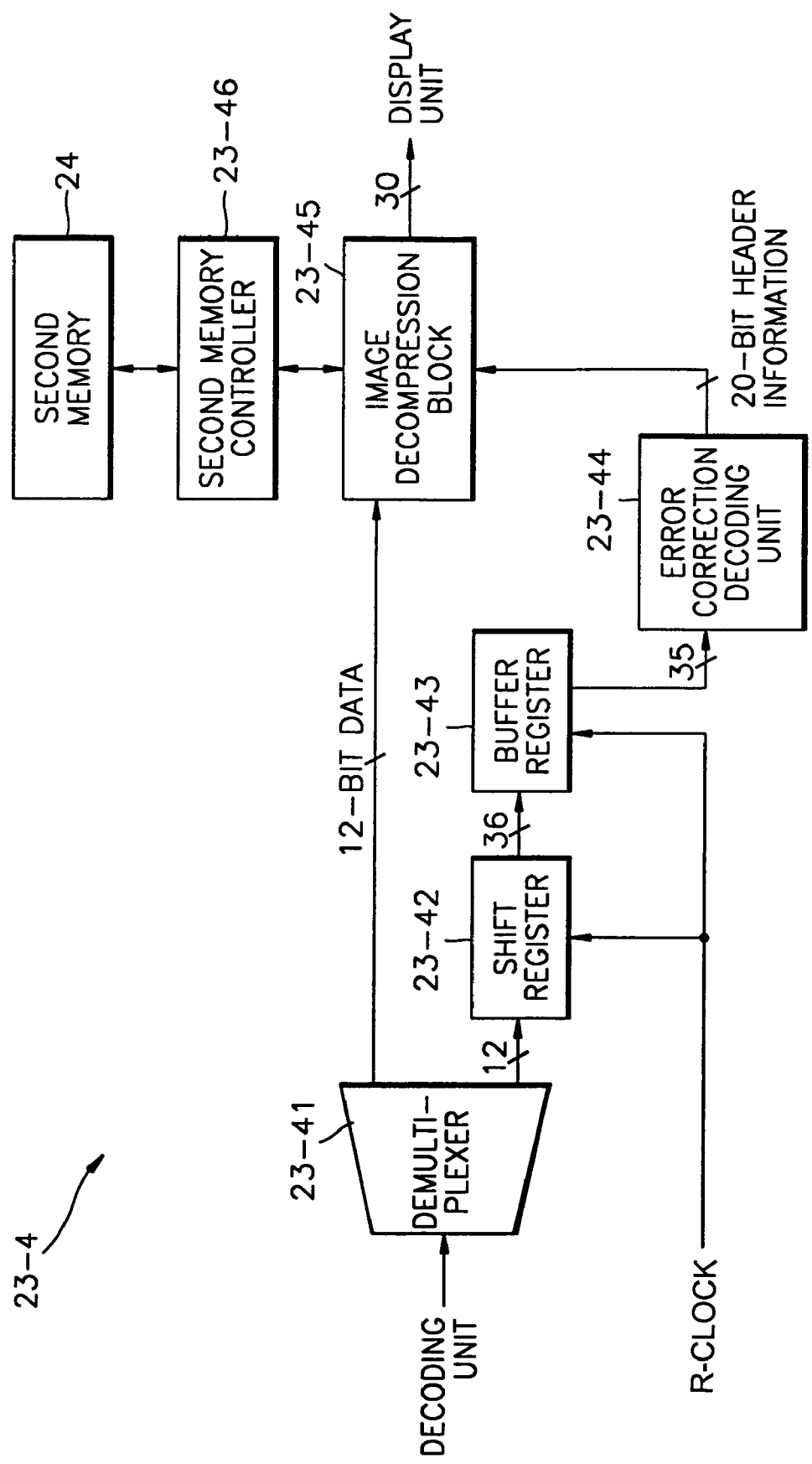
FIG. 10 is a detailed block diagram of the image decompression processor in the apparatus shown in FIG. 2.

FIG. 10 is a detailed block diagram of the image decompression processor 23-4. The image decompression processor 23-4 comprises a demultiplexer 23-41, a shift register 23-42, a buffer register 23-43, an error correction decoding unit 23-44, an image decompression block 23-45 and a second memory controller 23-46.

The demultiplexer 23-41 demultiplexes the 12 bit combined transmission data and header information output from the decoding unit 23-3 into 12-bit transmission data and 12-bit header information. The Line State (LS) signal enables the demultiplexer 23-41 to distinguish between transmission data and header information. The shift register 23-42 stores the 12-bit header information separated by the demultiplexer 23-41 until the header information has 36 bits, and shifts out the stored header information when the header information has 36 bits. The buffer register 23-43 stores shifted header information. The error correction decoding unit 23-44 decodes of the 36-bit encoded header information and outputs error corrected 20-bit header information to the image decompression block 23-45.

The image decompression block 23-45 restores the original graphic signal from the 12-bit transmission data output from the demultiplexer 23-41 and the 20-bit header information output from the error correction decoding unit 23-44. The image decompression block 23-45 restores the 24-bit RGB graphic signal by ascertaining from the header information LS whether the 12 bits (4 bits for RGB each) of the transmission data are MSBs or LSBs and also by ascertaining from the header information LP which line is to be corrected, and outputs the restored graphic signal to the display unit 25. The second memory controller 23-46 controls the second memory 24 and the image decompression block 23-45 so that the original graphic signal is restored.

Figure 11A:
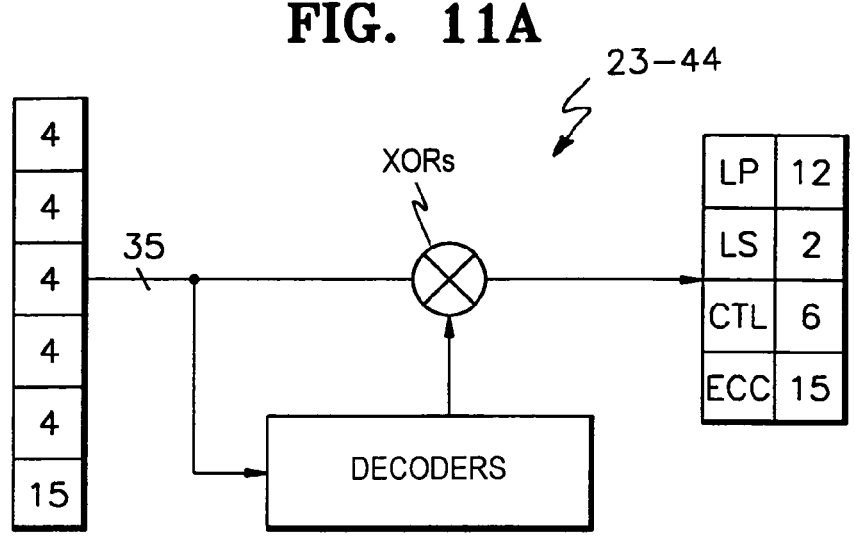
FIGS. 11A and 11B are block diagrams for illustrating error correction decoding performed in the image decompression processor shown in FIG. 10.
Figure 11B:
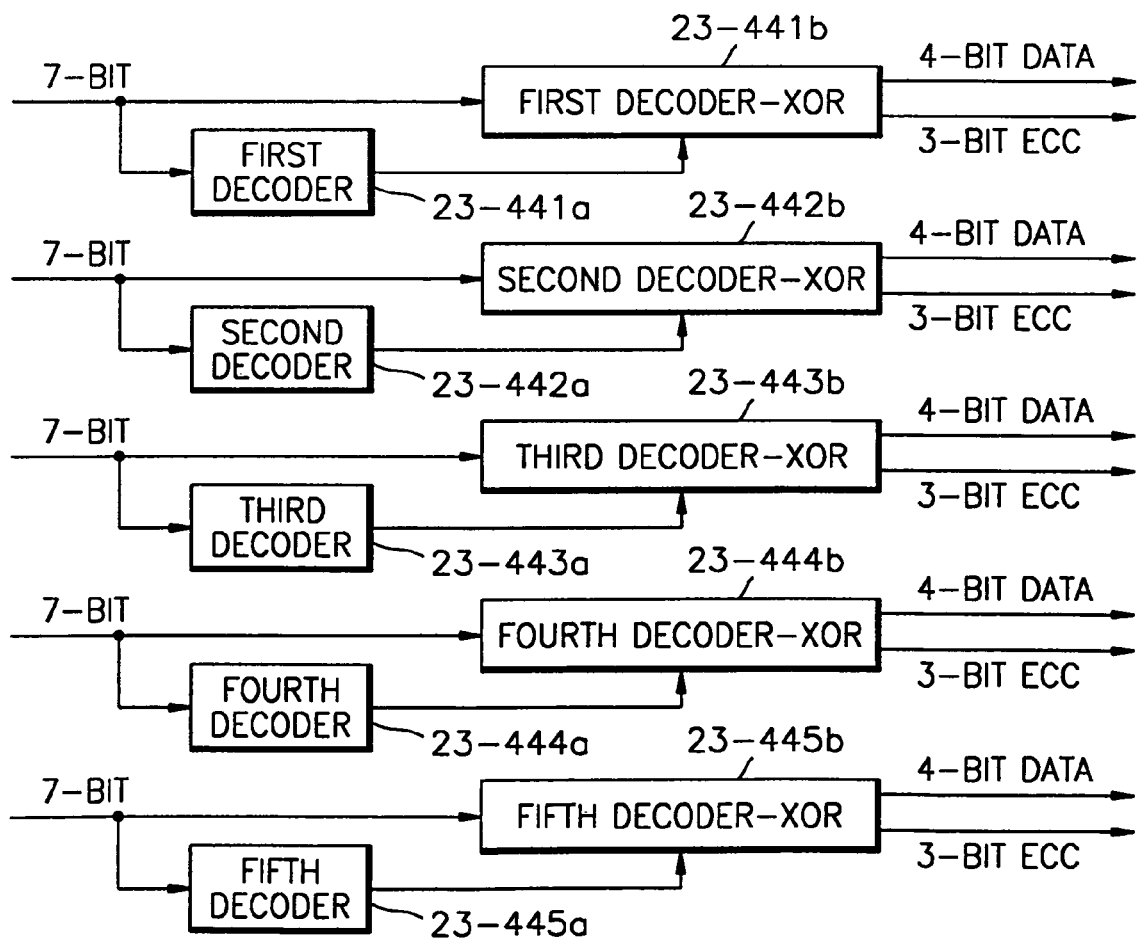

FIGS. 11A and 11B are block diagrams for illustrating error correction decoding performed in the image decompression processor 23-4 of FIG. 10. Referring to FIG. 11B, the image decompression processor 23-4 includes first through fifth decoders 23-441*a*, 23-442*a*, 23-443*a* and 23-444*a* and first through fifth decoder-XORs 23-441*b*, 23-442*b*, 23-443*b*, 23-444*b* and 23-445*b*.

Referring now to FIG. 11A, the buffer register 23-43 (FIG. 10) divides a 15-bit encoded ECC in units of 3 bits and the header information in units of 4 bits. The 3 bits of the encoded ECC are added to each of the 4-bits of header information, and thus a total of 7 bits are input to each of the first through fifth decoders 23-441*a*, 23-442*a*, 23-443*a*, 23-444*a* and 23-445*a* and each of the first through fifth decoder-XORs 23-441*b*, 23-442*b*, 23-443*b*, 23-444*b* and 23-445*b*. The 7-bit decoded header information output from the first through fifth decoders 23-441*a*, 23-442*a*, 23-443*a*, 23-444*a* and 23-445*a* undergo XOR operations with 7-bit header information input to the first through fifth decoder-XORs 23-441*b*, 23-442*b*, 23-443*b*, 23-444*b* and 23-445*b*, respectively, whereby 4-bit header information and a 3-bit decoded ECC are obtained and separately output. Thus, where the header information output from the first through fifth decoder-XORs 23-441*b*, 23-442*b*, 23-443*b*, 23-444*b* and 23-445*b* are combined, the original header information comprising a 12-bit LP, a 2-bit LS, a 6-bit CTL and a 15-bit ECC are obtained. The header information is error corrected based on the 15-bit ECC and error corrected 20-bit header information is output to the image decompression block 23-45 which outputs the original graphic signal to the display unit 13 as described above.

Figure 12:
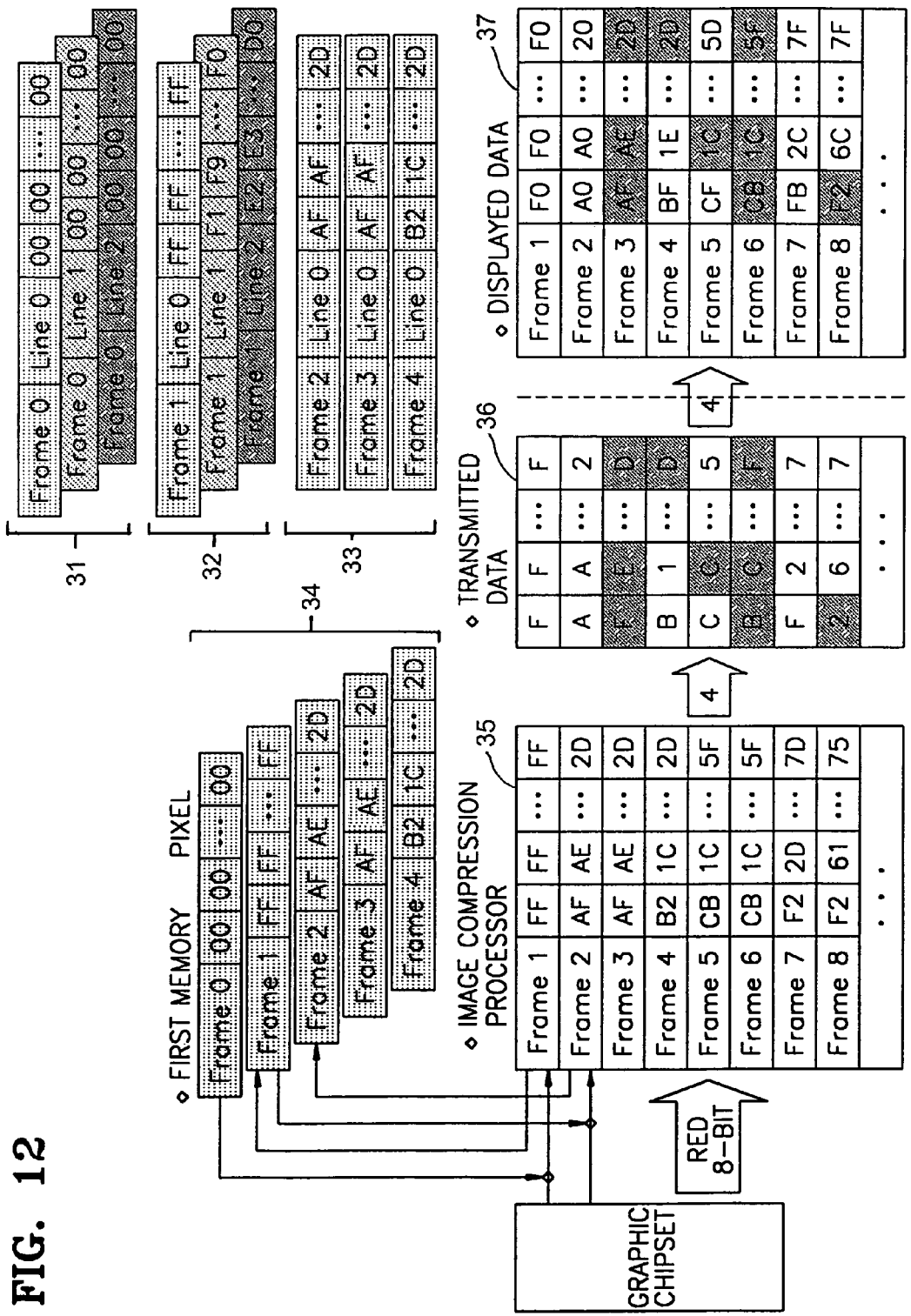
FIG. 12 is a view for explaining a method of transmitting an optical signal of a graphic signal, according to the present invention.

FIG. 12 is a diagram for explaining a method of transmitting an optical signal of a graphic signal, according to the present invention. FIG. 12 describes a process in which a 24-bit digital graphic signal generated by a graphic signal generation apparatus such as a notebook computer or a desktop computer and output by 8 bits via three R, G and B channels is converted into a 1-channel optical signal and transmitted to a display unit.

Pixel data of a current graphic signal frame 1 is compared with the corresponding pixel data of a previous frame 0. If there are changed values in the pixel data, the image compression processor 22-1 selects data of a predetermined number of MSBs, such as for example 4 bits per pixel per channel or 2 bits per pixel per channel, for each channel among the changed pixel data of the current graphic signal.

Figure 13:
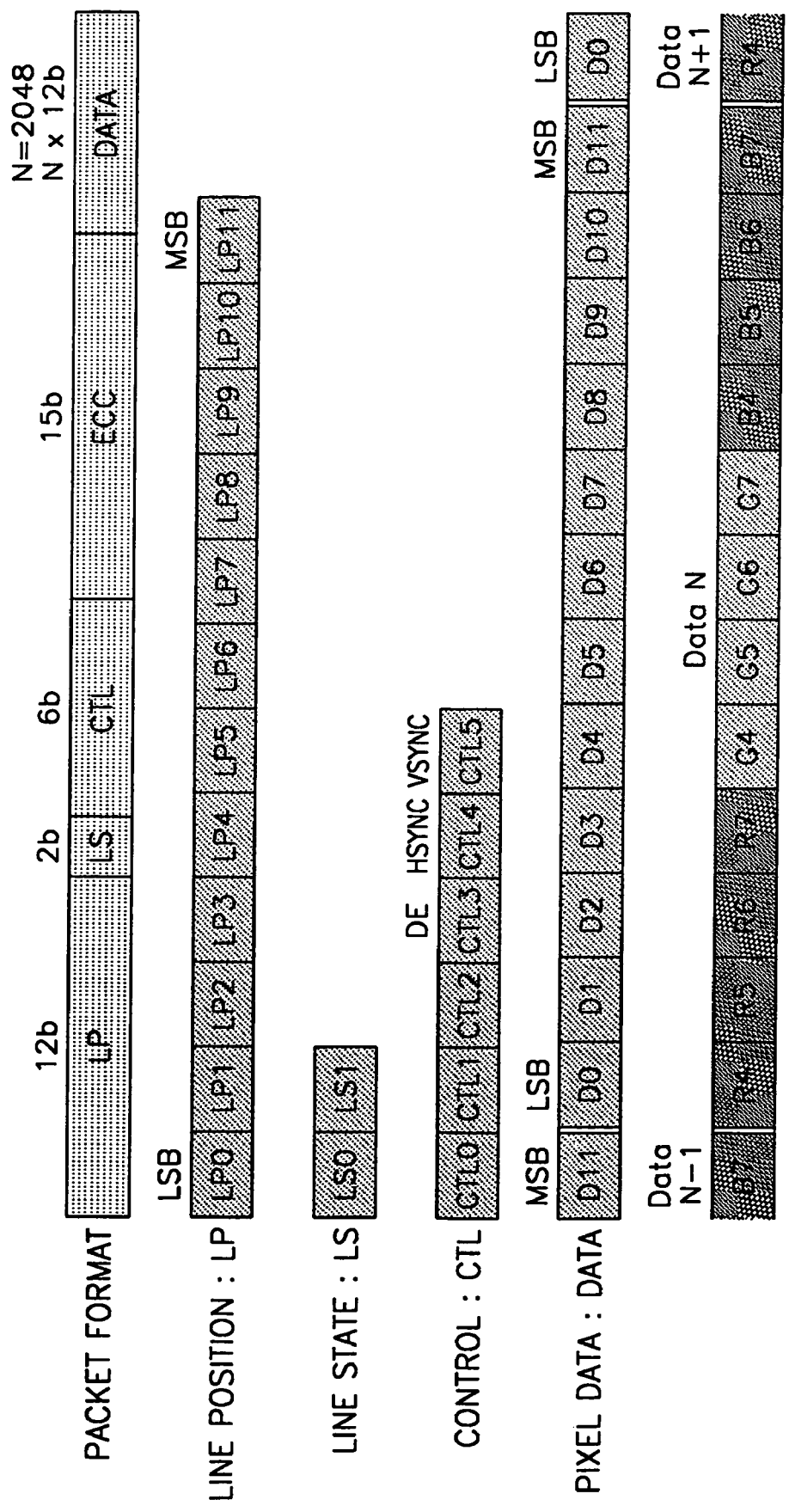
FIG. 13 shows an embodiment of a graphic signal transmission format for the apparatus of FIG. 2 and the method of FIG. 11.

Assuming that 4 bits per pixel per channel are selected, a total of 12 bits of graphic signal comprising 4 bits for a red channel, 4 bits for a green channel and 4 bits for a blue channel are transmitted for each pixel in accordance with the graphic signal transmission format shown in FIG. 13. Referring again to FIG. 12, examples of compressing and transmitting data for a red 8-bit channel are illustrated by tabulations showing states of pixel data by frame and line. Tabulation 31 shows exemplary data for pixels 0, 1 and n of lines 0, 1 and 2 of Frame 0; tabulation 32 shows exemplary data for pixels 0, 1 and n of lines 0, 1 and 2 of Frame 1, and tabulation 33 shows exemplary values for pixels 0, 1 and n of line 0 of Frames 2, 3 and 4.

In the case of the red channel, when frame 1 is input, line 0 of the frame 1 has different values (FF, FF, ... FF) than the line 1 of the frame 0 (00, 00, ... 00). Thus, the upper four MSBs F of the pixels of the line 0 of the frame 1 are transmitted. A horizontal synchronization signal HSYNC among the six control bits CTL (FIG. 13) for a graphic signal is counted and thus defines the line number of line 0 using the counted value. The counted value is used as a 12-bit LP, by which a maximum of 4096 line numbers may be defined. The state of a 4-bit transmitted graphic signal per channel is ascertained using an LS representing whether the 4 bits of a graphic signal per channel are MSBs or LSBs.

Next, when graphic frame 2 is input, the signal of frame 1 processed while the signal of frame 2 is input is stored and stands by to be compared with the information on frame 2. The pixels of line 0 of the stored frame 1 (FF, FF, ... FF) are compared with the pixels of line 0 of the current frame 2. Since the line 0 of current frame 2 (tabulation 33) has differences (AF, AF, ... 2D) from the frame 1 as the result of the comparison, 4 MSBs (A, A, ... 2) are transmitted for line 0 of frame 2. The signal of frame 3 line 0 (AF, AF, ... 2D) (tabulation 33) has no different portions from the signal of frame 2 line 0, so that four LSBs (F, F, ... D) are transmitted. Through this process, a 24-bit graphic signal is transmitted in the form of 12-bit transmission data, 20-bit header information including a 12-bit LP, a 2-bit LS, a 6-bit control signal including DE, HSYNC, VSYNC, CTL0, CTL1 and CTL2, and a 15-bit ECC for correcting the error of a header. The signals CTL0, CTL1 and CTL2 are extra control bits.

In another example of transmitting a graphic signal according to the present invention, graphic data of pixels in current and prior frames are compared in a comparison group other than a line as described above. A comparison group may be, for example, a line as discussed above, a group of lines within a frame or an entire frame. In tabulations 34 and 35 of FIG. 12, the first, second and fourth data columns represent exemplary data of corresponding pixels in first, second and $k^{th}$ comparison groups, respectively, of the frame indicated in column 1. Transmitted MSB data or LSB data are shown in tabulation 36 and displayed MSB and LSB data are shown in tabulation 37. In tabulations 36 and 37, unshaded areas represent instances where MSBs are transmitted and displayed and shaded areas represent instances where LSBs are transmitted and displayed.

Consider the following examples of transmission. The frame 1 pixel data FF in the first comparison group (tabulation 35) is compared with corresponding stored frame 0 pixel data 00 in the corresponding comparison group. Since a difference exists, MSBs F are transmitted as shown in tabulation 36 and displayed as shown in tabulation 37. In another example, the frame 5 pixel data 1C in the second comparison group (tabulation 35) is compared with corresponding stored frame 4 pixel data 1C (tabulation 34) in the corresponding comparison group. Since no difference exists, LSBs C are transmitted as shown in tabulation 36 and displayed as shown in tabulation 37. In yet another example, the frame 2 pixel data 2D in the $k^{th}$ comparison group is compared with corresponding stored frame 1 pixel data 2D in the corresponding comparison group. Since a difference exists, MSBs D are transmitted as shown in tabulation 36 and displayed as shown in tabulation 37.

Figure 14:
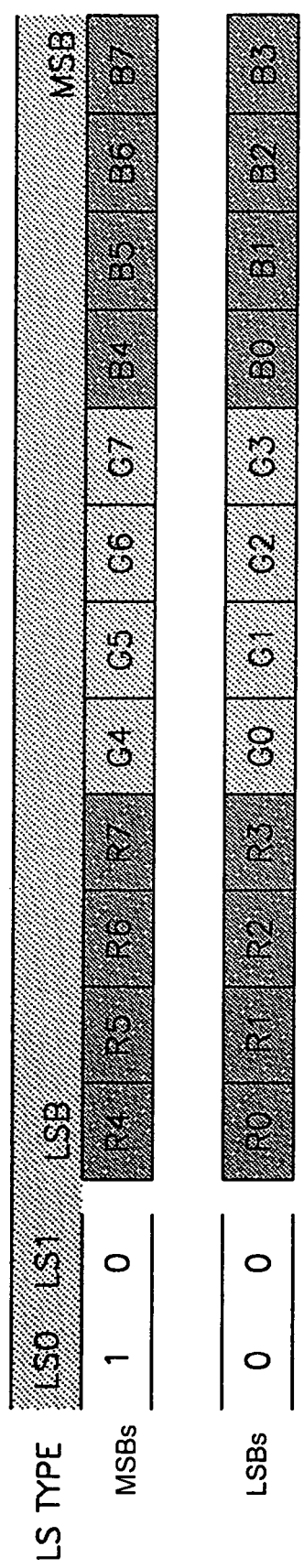
FIG. 14 is a view for explaining the graphic signal transmission format of FIG. 13.

The transmission format of graphic transmission data made according to the present invention is shown in FIGS. 13 through 16. FIG. 13 refers to a case where 4 bits of changed pixel information per channel are selected and transmitted. When 4 bits of changed pixel information per channel are selected, data comprising 35 bits of header information and 12 bits of transmission data per pixel are transmitted. FIG. 14 shows four bits of pixel data per channel selected as shown in FIG. 13. It can be seen from FIG. 14 whether 4 MSBs or 4 LSBs are transmitted according to the LS value. That is, if the LS0 is 1 and LS1 is 0, the MSBs are transmitted and if LS0 and LS1 are both 0, the LSBs are transmitted.

Figure 15:
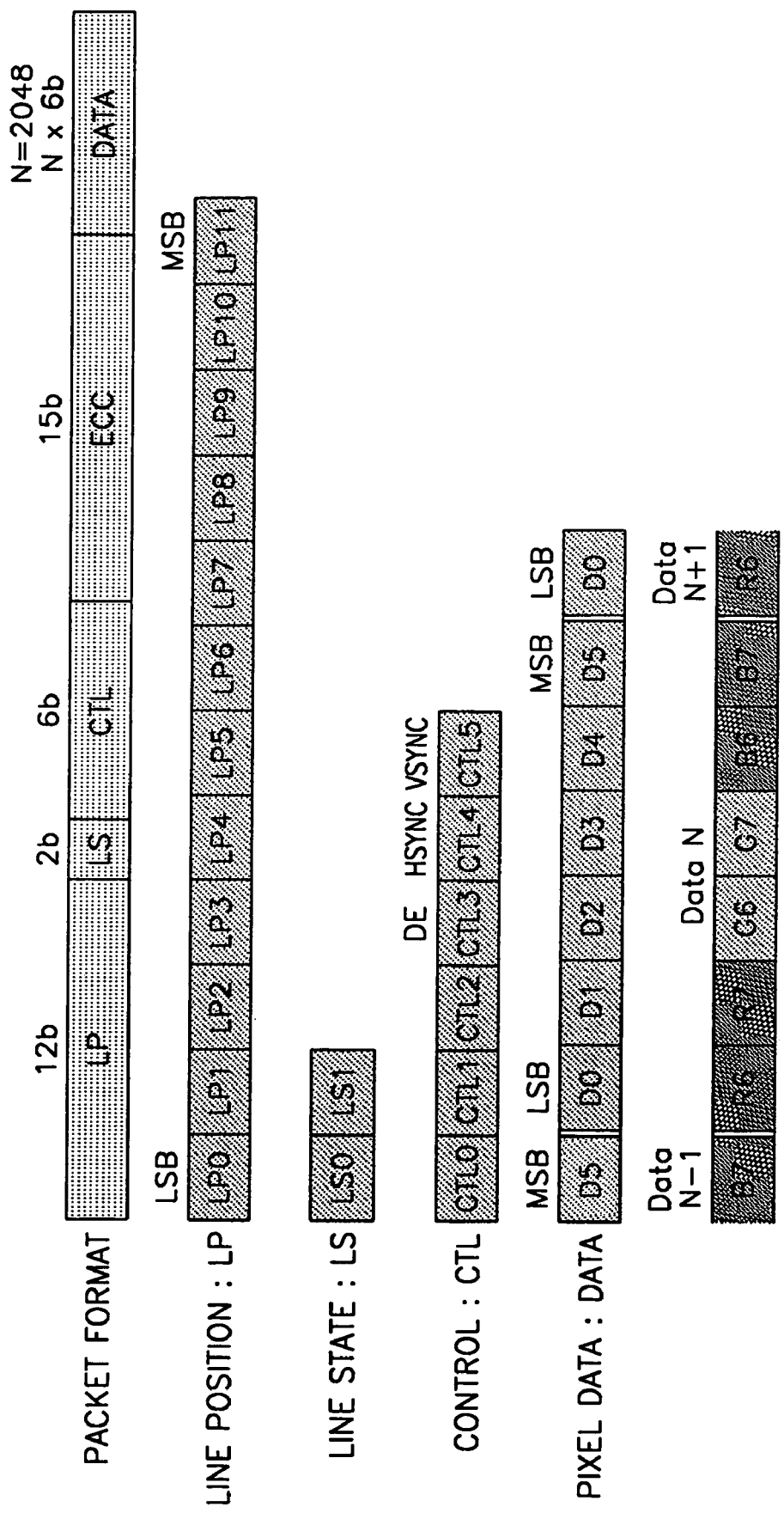
FIG. 15 shows another embodiment of a graphic signal transmission format for the apparatus of FIG. 2 and the method of FIG. 11.

FIG. 15 refers to a case in which 2 bits of changed pixel information per channel are selected and transmitted. When 2 bits of changed pixel information per channel are selected 35 bits of header information and 6 bits of transmission data per pixel are transmitted. FIG. 16 shows two bits of pixel data per channel selected as shown in FIG. 15. It can be seen from FIG. 16 whether 2 MSBs or 2 LSBs per channel are transmitted according to the LS value. Further it can be seen whether the upper two of the MSBs or the lower two of the MSBs are transmitted or whether the upper two of the LSBs or the lower two of the LSBs are transmitted according to the values of LS0 and LS1.

The selection of changed pixel information can be arbitrarily made by a command set by a user. That is, in the format of FIG. 15, two MSBs or 2 LSBs may be arbitrarily selected and in the format of FIG. 13, four MSBs or four LSBs may be arbitrarily selected.

FIG. 17 is a table in which the data transmission rate of a conventional graphic signal transmission apparatus is compared with that of an apparatus for transmitting an optical signal of a graphic signal, according to the present invention. The transmission rate of a graphic signal transmitted by the apparatus and method according to the present invention is about 70% less than that of an existing interface transmission apparatus. In the case of transmission of an UXGA resolution, an existing interface apparatus requires a 1.6 Gbps transmission rate per channel and a total of 4.86 Gbps speed, but an apparatus according to the present invention requires a 1.4 Gbps transmission rate per channel since the apparatus enables transmission via one channel.

According to the present invention as described above, the transmission rate of data is reduced by using a compression/decompression processor for transmitting a graphic signal to a display device via a single optical channel, and the error of data generated during transmission is found and corrected using a transmission data error correction code. Also, a signal interference between channels, a delay of inter-channel transmission and electromagnetic interference, which are generated by an electrical transmission method, are prevented, and long-distance transmission is improved. Furthermore, external connection is simplified.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for transmitting a graphic signal generated by a graphic signal generation unit to a display unit, the apparatus comprising:
   an optical transmission medium;
   a transmission interface unit which:
      compares a current graphic signal with a previous graphic signal and compresses the current graphic signal to generate transmission data, wherein the current graphic signal is compressed to an MSB bitstream where the comparison identifies a change between the current graphic signal and the previous graphic signal and is compressed to an LSB bitstream where the comparison identifies no change between the current graphic signal and the previous graphic signal,
      modulates the transmission data together with header information into an optical signal, and
      transmits the optical signal via a single channel of the optical transmission medium; and
   a reception interface unit which regenerates a graphic signal based on the transmission data and the header information contained in the optical signal and transmits the regenerated graphic signal to the display unit.

2. An apparatus for transmitting a graphic signal generated by a graphic signal generation unit to a display unit, the apparatus comprising:
   a transmission interface unit which compares a current graphic signal with a previous graphic signal to generate compressed transmission data based on the comparison, modulates the transmission data together with header information into an optical signal for transmission via a single channel, and transmits the optical signal, the transmission interface unit comprising:
      an image compression processor which outputs the transmission data and the header information based on the comparison,
      a DC-balancing encoding unit which DC-balances the transmission data and header information,
      a serialization unit which serializes the DC-balanced transmission data and header information, to output a serialized signal, and
      an optical transmission unit which converts the serialized signal into the optical signal and transmits the optical signal to the optical transmission medium;
   an optical transmission medium which communicates the transmitted optical signal; and
   a reception interface unit which regenerates a graphic signal based on the transmission data and the header information contained in the optical signal and transmits the regenerated graphic signal to the display unit.

3. The apparatus of claim 2, further comprising a first memory which stores the previous graphic signal.

4. The apparatus of claim 2, wherein the image compression processor outputs a bitstream comprising the compressed transmission data and header information, the header information comprising:
   a bitstream indicating position information of the current graphic signal;
   a data enable bit of the current graphic signal;
   a bitstream comprising a horizontal/vertical synchronization signal,
   a control bitstream; and
   an error correction bitstream for correcting errors of the bitstreams.

5. The apparatus of claim 2, wherein the image compression processor compresses the current graphic signal to an MSB or an LSB bitstream according to whether the current graphic signal has portions which differ from the previous graphic signal, and outputs the MSB bitstream or the LSB bitstream as the transmission data.

6. The apparatus of claim 5, wherein the image compression processor outputs one of the MSB bitstream, the LSB bitstream, and another bitstream as the transmission data, where the another bitstream is determined by a predetermined set command.

7. The apparatus of claim 2, wherein the image compression processor comprises:
   an image compression block which outputs the transmission data and outputs the predetermined header information based on the transmission data;
   an error correction encoding unit which encodes information for correcting error of the header information;
   a shifting unit which shifts out the encoded error-corrected header information if the encoded header information has a predetermined minimum number of bits; and
   a switching unit which switches the transmission data and the shifted header information based on a clock input to combine the transmission data and the shifted header information.

8. An apparatus for transmitting a graphic signal generated by a graphic signal generation unit to a display unit, the apparatus comprising:
   a transmission interface unit which:
      compares a current graphic signal with a previous graphic signal and compresses the current graphic signal to generate compressed transmission data based on the comparison,
      modulates the transmission data together with header information into an optical signal for transmission via a single channel, and
      transmits the optical signal; and
   an optical transmission medium which communicates the transmitted optical signal; and
   a reception interface unit which regenerates a graphic signal based on the transmission data and header information contained in the optical signal and transmits the regenerated graphic signal to the display unit, the reception interface unit comprising:
      an optical reception unit which converts the optical signal received from the optical transmission medium into an electrical graphic signal, a de-serialization unit which converts the electrical graphic signal into a parallel graphic signal, a decoding unit which decodes the parallel graphic signal into a graphic signal corresponding to the compressed transmission data and the header information, and an image decompression processor which decompresses the decoded signal, regenerates a graphic signal corresponding to the current graphic signal based on the decoded graphic signal and transmits the regenerated graphic signal to the display unit.

9. The apparatus of claim 8, further comprising a second memory which stores the regenerated graphic signal.

10. The apparatus of claim 8, wherein the image decompression processor comprises:

a demultiplexer which demultiplexes the decoded graphic signal output from the decoding unit into the transmission data and the header information;

a shifting unit which serially shifts out the demultiplexer header information;

an error correction decoding unit which decodes an error of the encoded header information if the shifted header information has a predetermined minimum number of bits; and an image decompression block which regenerates the graphic signal from the demultiplexer transmission data and the decoded header information.

11. The apparatus of claim 8, wherein the de-serialization unit comprises:

a clock divider which outputs a clock signal having a lesser frequency than an input clock a D-flip flop which synchronizes the electrical graphic signal with the lesser frequency clock signal;

a shift register which stores data output from the D flip-flop and shifts out the stored data when the stored data has a predetermined number of bits; and a parallel register which stores the shifted out data.

12. Method of transmitting a graphic signal generated by a graphic signal generation unit to a display unit using an optical transmission medium, the method comprising:

comparing a current graphic signal and a previous graphic signal, to identify a change between the current graphic signal and a previous graphic signal;

compressing the current graphic signal to an MSB bitstream if a change is identified and compressing the current graphic signal to an LSB bitstream if no change is identified;

modulating the compressed graphic signal together with header information into an optical signal;

transmitting the optical signal via a single channel of the optical transmission medium;

regenerating a graphic signal based on the transmission data and the header information included in the optical signal; and transmitting the regenerated graphic signal to the display unit.

13. Method of transmitting a graphic signal generated by a graphic signal generation unit to a display unit using an optical transmission medium, the method comprising:

comparing a current graphic signal and a previous graphic signal and generating compressed transmission data based on the comparison, modulating the transmission data together with header information into an optical signal for transmission via a single channel;

transmitting the optical signal via the optical transmission medium;

regenerating a graphic signal based on the transmission data and the header information included in the optical signal; and transmitting the regenerated graphic signal to the display unit, wherein the modulating comprises:

DC-balancing the transmission data and header information, serializing the DC-balanced transmission data and header information, and converting the serialized DC-balanced transmission data and header information into the optical signal.

14. The method of claim 11, wherein, the header information comprises:

a bitstream indicating a position of the current graphic signal, a data enable bit of the current graphic signal, a horizontal/vertical synchronization signal, a control bitstream, and an error correction bitstream for correcting error of the bitstreams.

15. The method of claim 14, wherein the generating of the transmission data comprises:

compressing the current graphic signal to an MSB or an LSB bitstream according to whether the current graphic signal differs from the previous graphic signal and outputting the MSB bitstream or the LSB bitstream as the transmission data.

16. The method of claim 15, further comprising outputting one of the MSB bitstream, the LSB bitstream and another bitstream as the transmission data, wherein the another bitstream is output by a predetermined set command.

17. The method of claim 11, further comprising:

correcting an error of the header information and encoding the error-corrected header information;

shifting the encoded error-corrected header information into a predetermined serial bitstream if the encoded header information has a predetermined minimum number of bits; and switching the transmission data and the shifted header information.

18. Method of transmitting a graphic signal generated by a graphic signal generation unit to a display unit using an optical transmission medium, the method comprising:

comparing a current graphic signal and a previous graphic signal and generating compressed transmission data based on the comparison, modulating the transmission data together with header information into an optical signal for transmission via a single channel;

transmitting the optical signal via the optical transmission medium;

regenerating a graphic signal based on the transmission data and the header information included in the optical signal; and transmitting the regenerated graphic signal to the display unit, wherein the regenerating of the graphic signal comprises:

converting the optical signal into an electrical signal, converting the electrical signal into a parallel signal, decoding the parallel signal into the transmission data and the header information, and decompressing the compressed decoded transmission data based on the header information to generate a decompressed graphic signal.

19. The method of claim 18, wherein the converting of the electrical signal to a parallel electrical signal comprises:
   demultiplexing the electrical signal into the transmission data and the header information; and
   serially shifting out the demultiplexed header information.

20. An apparatus for transmitting graphic signals via a single channel optical transmission medium, the apparatus comprising:
   a processor which compares a current one of the graphic signals with a previous one of the graphic signals and outputs:
      transmission data comprising a first number of least significant bits (LSBs) of the current graphic signal if the current graphic signal is the same as the previous graphic signal, or
      transmission data comprising a second number of most significant bits (MSBs) of the current graphic signal if the current graphic signal differs from the previous graphic signal, and
      header information comprising information which indicates whether the transmission data comprises the LSBs or the MSBs;
   an error correction encoder which adds error correction coding information to the header information;
   a multiplexer which combines the error correction coded header information and the transmission data into a parallel bitstream;
   a serializer converts the parallel bit stream into one serial bitstream; and
   an optical converter which converts the one serial bitstream to a serial optical signal.

21. The apparatus of claim 20, wherein the current graphic signal and the previous graphic signal are adjacent frames and the processor compares corresponding pixel data of the adjacent frames.

22. The apparatus of claim 20, wherein the current graphic signal and the previous graphic signal are corresponding lines of adjacent frames and the processor compares corresponding pixel data of the corresponding lines.

23. The apparatus of claim 20, wherein the current graphic signal and the previous graphic signal are a plurality of corresponding lines of adjacent frames and the processor compares corresponding pixel data of the plurality of corresponding lines.

24. The apparatus of claim 20, wherein the transmission data comprises R, G and B channels of the graphic signal and the number of MSBs or the number of LSBs transmitted is one half a number of bits assigned to a channel.

25. The apparatus of claim 20, wherein the transmission data comprises R, G and B channels of the graphic signal and the number of MSBs or the number of LSBs transmitted is one fourth a number of bits assigned to a channel.

26. The apparatus of claim 20, wherein the information which indicates whether the LSBs or the MSBs are included in the transmission data is a predetermined number of bits having a first value where MSBs are included and a second value where LSBs are included.

27. An apparatus for recovering a graphic signal from a serial bit stream, the serial bitstream comprising a compressed graphic signal having one of a first number of most significant bits (MSBs) and a second number of least significant bits (LSBs) and error correction coded (ECC) header information which designates whether the compressed graphic signal comprises the MSBs or the LSBs, the apparatus comprising:
   a phase locked loop which phase locks the serial bit stream to generate a clock signal;
   a shift register which shifts out the serial bits into a parallel bit stream according to the generated clock signal;
   a demultiplexer which separates the parallel bit stream into a first parallel bit stream corresponding to the compressed graphic signal and a second parallel bit stream corresponding to the ECC header information;
   an ECC decoder which recovers header information from the second parallel bit stream which designates whether the first parallel bit stream comprises the MSBs or the LSBs; and
   a decompressor which regenerates a graphic signal based on the first parallel bitstream and the recovered header information.

28. An apparatus for compressing a graphic signal for transmission via a single channel optical transmission medium, the apparatus comprising:
   a first memory which stores a first graphic signal;
   a processor which compares a second graphic signal with the stored graphic signal and outputs:
      transmission data comprising a first number of least significant bits (LSBs) of the second graphic signal if the second graphic signal is the same as the stored graphic signal, or
      transmission data comprising a second number of most significant bits (MSBs) of the second graphic signal if the second graphic signal differs from the first graphic signal, and
      header information comprising information which indicates whether the transmission data comprises the LSBs or the MSBs.

29. The apparatus of claim 28, further comprising:
   an error correction encoder which adds error correction coding information to the header information; and
   a multiplexer which combines the error correction coded header information and the transmission data into a common bitstream.

30. The apparatus of claim 28, wherein:
   the graphic signal comprises components corresponding to a plurality of channels; and the processor further comprises:
      a plurality of image compression modules, each of which compares one of the plurality of component signals of the first graphic signal with a respective one of corresponding component signals of the second graphic signal to output respective components of the transmission data and a respective indicator signal based on the respective comparisons, and
      a logic circuit which combines the respective indicator signals to output the header information which indicates whether the transmission data comprises the LSBs or the MSBs.

* * * * *

UNITED STATES PATENT AND TRADEMARK OFFICE
CERTIFICATE OF CORRECTION

PATENT NO. : 7,146,051 B2
APPLICATION NO. : 09/876150
DATED : December 5, 2006
INVENTOR(S) : Heui-jong Kang et al.

It is certified that error appears in the above-identified patent and that said Letters Patent is hereby corrected as shown below:

Column 13, line 31, insert -- ; -- after "clock"

Column 13, line 38, insert -- A -- before "method"

Column 13, line 57, insert --A -- before "method"

Column 14, line 13, change "claim 11" to --claim 13--

Column 14, line 34, change "claim 11" to --claim 13--

Column 14, line 43, insert --A -- before "method"

Column 16, line 47, start new paragraph after "channels; and"

Signed and Sealed this

Tenth Day of April, 2007

JON W. DUDAS
*Director of the United States Patent and Trademark Office*